(12) United States Patent
Uemura et al.

(10) Patent No.: US 6,451,103 B1
(45) Date of Patent: Sep. 17, 2002

(54) SELF-DISPERSIBLE AQUEOUS PIGMENT DISPERSION

(75) Inventors: Toshiyuki Uemura; Tsukasa Iguchi; Mikiya Kato; Akimitsu Mochizuki, all of Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 66 days.

(21) Appl. No.: 09/667,499

(22) Filed: Sep. 22, 2000

(51) Int. Cl.⁷ .................. C09D 17/00; C09D 11/00; C09K 67/00
(52) U.S. Cl. .............. 106/493; 106/410; 106/411; 106/412; 106/413; 106/494; 106/495; 106/496; 106/497; 106/498
(58) Field of Search ............... 106/410, 411, 106/412, 413, 493, 494, 495, 496, 497, 498

(56) References Cited

U.S. PATENT DOCUMENTS

| | | | | |
|---|---|---|---|---|
| 3,973,981 A | * | 8/1976 | Miyatake et al. | 106/31.75 |
| 5,187,229 A | * | 2/1993 | Yamamoto et al. | 525/123 |
| 5,244,979 A | * | 9/1993 | Yamamoto et al. | 516/31 |
| 5,795,376 A | * | 8/1998 | Ide | 106/31.6 |
| 5,882,390 A | | 3/1999 | Nagi et al. | |
| 5,961,711 A | * | 10/1999 | Saikatsu et al. | 106/498 |
| 6,083,315 A | * | 7/2000 | Nakamura et al. | 106/31.6 |

FOREIGN PATENT DOCUMENTS

| | | |
|---|---|---|
| JP | 56-155260 | 12/1981 |
| JP | 56-155261 | 12/1981 |
| JP | 56-155262 | 12/1981 |
| JP | 10-036741 | 2/1998 |
| JP | 11-049974 | 2/1999 |

* cited by examiner

*Primary Examiner*—Anthony J. Green
(74) *Attorney, Agent, or Firm*—Oblon, Spivak, McClelland, Maier & Neustadt, P.C.

(57) ABSTRACT

There is disclosed a self-dispersible aqueous pigment dispersion and preparing method thereof, the dispersion comprising an aqueous solution, particles of a pigment and a water-soluble pigment derivative, said particles being dispersed in the aqueous pigment dispersion in a concentration within the range from 2 to 25 wt. % based on the amount of the aqueous pigment dispersion, wherein a part of the water-soluble pigment derivative is adsorbed on the surface of the particles of the pigment to form dispersed particles comprising the particles of the pigment adsorbed by said part of the pigment derivative, and the remaining parts of the water-soluble pigment derivative are free in the dispersion without being adsorbed on the surface of the pigment in a concentration less than the critical flocculation concentration on which flocculation is initiated on said particles of the pigment dispersed under said concentration. The pigment dispersion has high dispersibility in an aqueous system and excellent dispersion stability over time, and is applicable to an inkjet recording liquid, which provides excellent light-resistance, water-resistance and hue of printed image, and simultaneously reveals excellent discharge stability at the nozzles of ink-jet printer.

16 Claims, 1 Drawing Sheet

SELF-DISPERSIBLE AQUEOUS PIGMENT DISPERSION

BACKGROUND OF THE INVENTION

1. Field of the Invention

The present invention relates to a self-dispersible aqueous pigment dispersion having easy dispersibility in an aqueous system and excellent dispersion stability over time, and a method for preparing the same. Further, the present invention relates to an inkjet recording liquid produced from the aqueous pigment dispersion, which provides excellent light-resistance, water-resistance and hue of printed image, and simultaneously reveals excellent discharge stability at the nozzles of ink-jet printer.

2. Description of the Prior Art

Conventionally, aqueous ink and aqueous paints have been prepared using a surfactant, dispersing agent, or dispersing resin for dispersing a pigment in water. In the case of a surfactant, a foaming problem exists, and co-use of a de-foaming agent is necessary for improving foaming property. However, the co-use of the surfactant and other additives leads to problems in balance of ink properties, such as compatibility of the de-foaming agent and the surfactant, and a leveling problem in drying after printing. In the case of a dispersing resin, extremely effective dispersion stabilizing effect is recognized owing to the resin, in the ink or paint of relatively high viscosity. However, in the case of dispersion having relatively low viscosity, dissolution of the resin into the solvent imparts a significant influence on the viscosity of the dispersion, giving limitation to lowness of viscosity.

On the other hand, there have been conventionally suggested methods in which the surface of a pigment powder is chemically modified for achieving sufficient dispersion property of the pigment. As industrially effected examples, surface treatments to carbon black utilizing gas phase or liquid phase process are found. The gas phase method aims at manifestation of a polar functional group by oxidation treatment such as ozone treatment and plasma treatment. The liquid phase method is used when further intense treatment is required than in the oxidation treatment usually conducted by the gas phase method, and uses a stronger oxidation agent such as nitric acid, sodium nitrite, sodium hypochlorite, permanganate, and the like. By conducting these treatments, dispersing a pigment into an aqueous system is possible without using a dispersing agent and resin. Their application range has been enlarged, therefore. However, in these cases, a demerit of high production cost is present due to features of the treating processes, and further, application of the technology to an organic pigment is impossible, resulting in limitation of use range.

Further, there have been known methods in which a pigment derivative is specifically used as a dispersing agent. Pigment particles are surface treated by the derivative in these methods. Namely, the pigment derivative treating method is a method in which an acidic group or basic group is introduced as a substituent into a compound of the same kind as a pigment to be dispersed, to give a pigment derivative, which is allowed to be adsorbed onto the pigment particles surface to increase its polarity, to improve its wetting property, and therefore, to enhance the dispersibility of pigment particles. However, these methods have problems that bleeding and color mixing tend to occur when the paint or ink produced therefrom is actually applied onto matter for painting or printing. Also, these methods have such a fatal problem unsolved, namely thixotropic characteristics of the system, that dispersed particles may easily happen to flocculate even if the dispersion of particles has been once attained. This has made it difficult for us to achieve a stable dispersion of pigment particles only by using a pigment derivative. Various trials have been made on addition of a surfactant, organic solvent and other additives to this dispersion system to improve the property, however, there have been actually no basic solution found. Rather, these additional additives make the disperse system complex and results in the troubles such as dewetting (crawling) during drying a coated film, etc.

Regarding their applications, recording liquid for inkjet printing, which has so proliferated in recent years, is one example for practical use of such aqueous coloring materials prepared by dispersing a dye or pigment in an aqueous system. As inkjet recording liquid, one which is prepared by dissolving a water-soluble dye in an aqueous solution composed of a glycol-based solvent and water has been conventionally used. However, the resulting recorded article has a problem of poor water-resistance since the recording liquid contains a water-soluble dye, and for improving this problem, a recording liquid prepared by dispersing an organic pigment in an aqueous medium has been developed. However, it is extremely difficult, as described above, to disperse a pigment in the form of a minute particle in an aqueous system and maintain the dispersed condition stably, unlike a dye which is dissolved in an aqueous system. In addition, high resolution of recent inkjet printing has made the nozzle diameter extremely minute. Accordingly, the particle size of a pigment used in the recording liquid is also required to be made finer, consequently, high dispersion of minute particles, which is a higher dispersion technology than that of the conventional ones, is needed. Further, properties naturally required for a recording liquid such as discharge stability from printer nozzles, re-dispersibility, color developing property after printing, and the like should also be maintained together, and under actual condition, simultaneous satisfaction of the properties required for an inkjet recording liquid has not been accomplished.

SUMMARY OF THE INVENTION

Accordingly, the primary object of the present invention is to provide a self-dispersible aqueous pigment dispersion having excellent storage stability over time. Another object of the present invention is to provide a pigment type inkjet recording liquid which manifests discharge stability at nozzles, and has sufficient color-reproducing range when printed, and has excellent water-resistance and light-resistance without bleeding and color mixing as above-mentioned.

The present invention disclosed herein is a self-dispersible aqueous pigment dispersion comprising an aqueous solution, particles of a pigment and a water-soluble pigment derivative, said particles being dispersed in the aqueous pigment dispersion in a concentration within the range from 2 to 25 wt. % based on the amount of the aqueous pigment dispersion, wherein a part of the water-soluble pigment derivative is adsorbed on the surface of the particles of the pigment to form dispersed particles comprising the particles of the pigment adsorbed by said part of the pigment derivative, and the remaining parts of the water-soluble pigment derivative are free in the dispersion without being adsorbed on the surface of the pigment in a concentration less than the critical flocculation concentration on which flocculation is initiated on said particles of the pigment dispersed under said concentration.

The water-soluble pigment derivative preferably comprises a compound in which an acidic functional group or salt thereof has been introduced into the skeleton of the pigment molecule. In this case, the acidic functional group is preferably a carboxylate group or sulfonate group.

In the pigment dispersion of the present invention, the dispersed particles preferably have an average particle diameter of 10 to 300 nm. Furthermore in the present invention, it is preferable that the particles of the pigment are dispersed in the aqueous pigment dispersion in a concentration within the range from 15 to 20 wt. % based on the amount of the aqueous pigment dispersion, and the viscosity of the aqueous pigment dispersion is 3 to 20 cps.

Regarding the pigment derivative, according to the present invention, said part of the aqueous pigment derivative adsorbed on the surface of the pigment is preferably in an amount ranging from 0.01 to 1.5 mmol/g based on the amount of the particles of the pigment.

Regarding pigment type, it is preferable that the pigment comprises a condensed polycyclic pigment. The condensed polycyclic pigment may be a quinacridone pigment or phthalocyanine pigment.

To accomplish the objects of the present invention, there is also disclosed herein a method for preparing a self-dispersible aqueous pigment dispersion in which particles of the pigment are dispersed in a concentration within the range from 2 to 25 wt. % based on the amount of the aqueous pigment dispersion, said method comprising the steps of (a) dispersing said particles of the pigment in an aqueous solution in which a water-soluble pigment derivative has been dissolved, to allow a part of the pigment derivative to be adsorbed on the surface of the particles, thereby forming dispersed particles comprising the particles of the pigment adsorbed by said part of the pigment derivative, and (b) removing the remaining parts of the pigment derivative free in the aqueous solution without being adsorbed in the step (a) to a concentration less than the critical flocculation concentration on which flocculation is capable of being initiated on said particles of the pigment dispersed under said concentration. In the method, the step (b) may comprise ultrafiltration.

In the method, the water-soluble pigment derivative preferably comprises a compound in which an acidic functional group or salt thereof has been introduced into the skeleton of the pigment molecule. The acidic functional group is preferably carboxylate residue.

In the method, it is desirable that the dispersed particles have an average particle diameter of 10 to 300 nm. It is preferable that the particles of the pigment are dispersed in the aqueous pigment dispersion in a concentration within the range from 15 to 20 wt. % based on the amount of the aqueous pigment dispersion, and the viscosity of the aqueous pigment dispersion is 3 to 20 cps.

Tthe step (a) is preferably conducted until said part of the pigment derivative adsorbed on the surface reaches 0.01 to 1.5 mmol/g based on the amount of the particles of the pigment.

Regarding pigment type used in the method, the pigment preferably comprises a condensed polycyclic pigment. The condensed polycyclic pigment may be a phthalocyanine pigment or quinacridone pigment.

The present invention also includes an inkjet recording liquid comprising the aqueous pigment dispersion heretofore described, a surfactant and/or an aqueous resin.

The present inventors have recognized that due to the substituent groups the pigment derivatives have some solubility to solvents, especially that of aqueous type, to which pigment particles must be dispersed, and have suspected that interactions between the solvent system and derivative molecules dissolved therein might causes, at least as one of the factors, the thixotropic unstableness as mentioned above, as well as bleeding and color-mixing when printed. In a practical routine, when pigment particles is intended to be dispersed in an aqueous solvent by adding a dispersing agent such as pigment derivative or some surfactant, it has been typical that, taking into account the adsorption/desorption equilibrium, they are added in amounts larger than the amount to be adsorbed on pigment particles, with the intention of making their dispersing performance to be at sufficient level.

The present invention has been accomplished based on the inventors' following points: (1) the additional amount required to achieve a sufficient level of dispersing is required at least on the stage of dispersion process in which the adsorption is forced to occur, not necessarily might be required after the adsorption has been once accomplished; (2) the uncertainty of how strongly and/or stably the adsorption can be attained actually, opposed to the directiveness to the equilibrium of adsorption/desorption in a derivative-diluted dispersion system; and, (3) the actual uncertainty of how effective the desorbed-derivative-deprived condition of the dispersion system is for its stability and accompanying property such as non-bleeding, non-color mixing of printed image. As detailed hereinafter and non-limitatively illustrated in the examples, the present inventors have achieved the method and product as those of practically useful degree based on those above conceptions and deliberate investigations so far conducted.

The aqueous pigment dispersion of the present invention shows, when used in an inkjet recording liquid, excellent water-resistance as printed, and good stability of the dispersed state as stored, causes no clogging at nozzles when charged in printers, and provides stable discharge over a long period of time during printing. The aqueous pigment dispersion shows, when printed on paper, sufficient color density as one of print qualities, a wider color reproducing range, and more excellent light-resistance as compared with a dye type dispersion. Therefore, the aqueous pigment dispersion of the present invention can be utilized in wider range as a colored print in fields such as document making, address writing of mails and, marking, numbering and bar cord imparting of corrugated boards in offices. In short, when the present invention is applied to an inkjet recording liquid of aqueous pigment dispersion type, which is desired to be improved recently as above described, the utility thereof is thought to be particularly large. However, the present invention is not necessarily limitative to inkjet printing, the dispersion can also be used in gravure ink, aqueous paint and other printing ink fields.

DESCRIPTION OF THE PREFERRED EMBODIMENT

Figure 1:
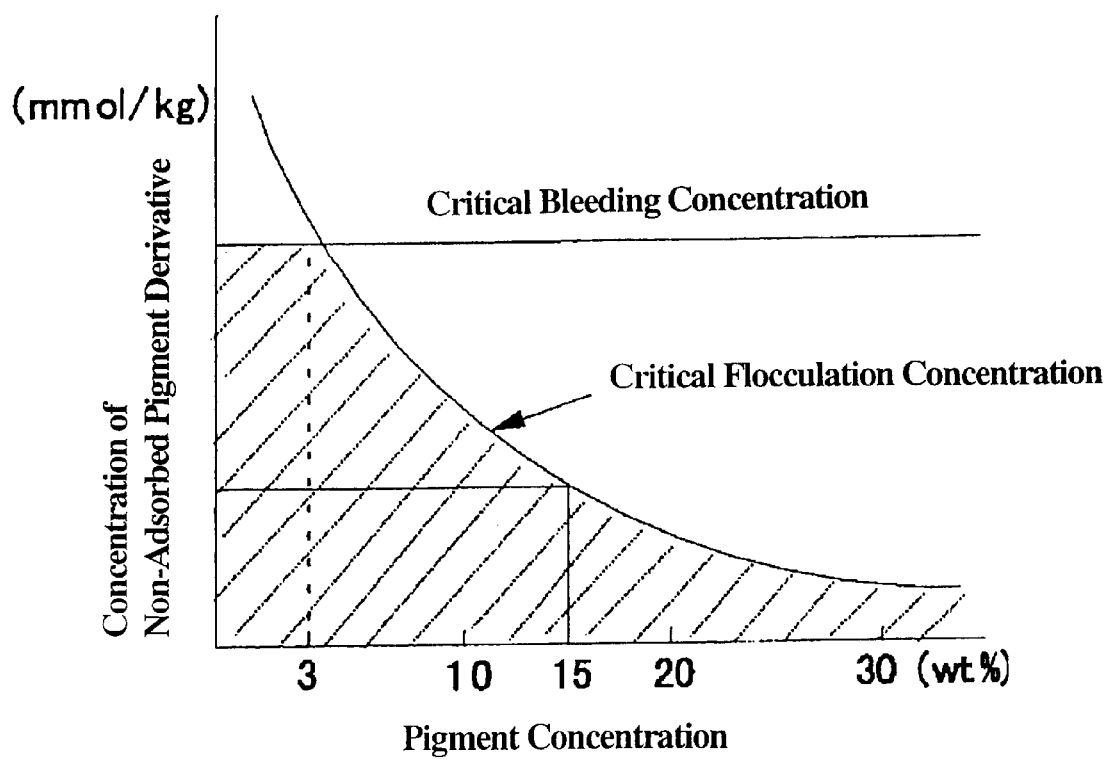
FIG. 1 shows the two curbs of the critical flocculation concentration and critical bleeding concentration of pigment derivative free in the dispersion, as functions of pigment concentration dispersed in solvent.

"Self-dispersible" referred to herein means a nature that hydrophilicity of the surface of pigment particles is increased to give stable dispersion in water by modifying the surface without using external dispersing aids such as a dispersing agent, surfactant, water-soluble resin and the like.

It is believed that the adsorption of a water-soluble pigment derivative to the surface of pigment particles is ascribed to close access of aromatic rings of respective chemical structures by hydrophobic mutual action causing π-π stacking. Pigment derivative is conventionally used as an effective dispersing agent for pigment particles, due to its extremely high adsorption action to pigment particles. Restrictively speaking, pigment derivative is used specifically as a "surface modifying agent" rather than "dispersing agent", according to the present invention, by leaving enough portions adsorbed and removing the other dispersing portions from the dispersion. The adsorbed portions may be laminar-adsorbed, rigidly, to pigment particles dispersed. The present invention can be understood to utilize the advantageous property of pigment derivative effectively, in an above-mentioned manner, without adversely-affecting side factors and effects, to accomplish a pigment dispersion which is highly stable over time and has low viscosity and high surface tension even under high concentration range of the pigment to be dispersed.

Examples of the pigment used in the present invention include quinacridone pigments (for example, C. I. Pigment Red 122, 202, 206, 207, 209, C. I. Pigment Violet 19, 42), phthalocyanine pigments (for example, C. I. Pigment Blue 15, 15:1, 15:2, 15:3, 15:4, 15:6, 16, C. I. Pigment Green 7, 36), azo pigments (for example, C. I. Pigment Red 2, 3, 5, 17, 22, 41, 38, 112, 144, 166, 146, 170, 176, 185, C. I. Pigment Yellow 1, 3, 12, 13, 14, 17, 55, 81, 83, 93, 94, 95, 97, 120, 166, 167, C. I. Pigment Orange 5, 10, 13, 16, 36), diketopyrrolopyrrole pigments (C. I. Pigment Red 254, 255, 264, 272, C. I. Pigment Orange 71, 73), threne pigments (C. I. Pigment Yellow 20, 24, 99, C. I. Pigment Orange 40, C. I. Pigment Red 168, 177, 216, C. I. Pigment Violet 31, 33, C. I. Pigment Blue 21, 22, 60), perynone pigments (C. I. Pigment Orange 43, C. I. Pigment Red 194), perylene pigments (C. I. Pigment Red 123, 149, 178, 179, 190, C. I. Pigment Brown 26), dioxazine pigments (C. I. Pigment Violet 23), isoindolinone pigments (C. I. Pigment Yellow 109, 110, 173, 180), benzimidazolone pigments (C. I. Pigment Yellow 120, 151, 154, 156, 175, 180, 181, 194, C. I. Pigment Orange 36, 60, 62, 72, C. I. Pigment Red 171, 175, 176, 185, 208, C. I. Pigment Violet 32, C. I. Pigment Brown 25), and anthraquinone pigments (C. I. Pigment Yellow 99, 108, 123, 147, 193, 199, C. I. Pigment Red 83, 89, 177). Condensed polycyclic pigments are preferable such as quinacridone pigments, phthalocyanine pigments, diketopyrrolopyrrole pigments, perynone pigments, perylene pigments, dioxazine pigments and the like.

The particle size of pigment particles used in the present invention is preferably from 50 to 0.01 μm, and when used in an inkjet recording liquid, it is preferably from 1 to 0.005 μm. It is preferable that primary particles of the pigment are subjected to milling work by wet milling or dry milling such as salt milling and solvent milling to reduce and control the particle size. It is also possible to conduct the surface treatment of a water-soluble pigment derivative in the milling process.

The water-soluble pigment derivative may have an acidic functional group such as —COOH, —COONa, —COOK, —SO$_3$H, —SO$_3$Na, —SO$_3$K, acidic amine base and the like on the pigment molecule skeleton. The number of the acidic functional group is preferably 1 or 2. Examples of the acidic amine base include functional groups having the following structures.

—COOH.H$_2$NR$^1$

—COOH.HN(R$^1$, R$^2$)

—COOH.N(R$^1$, R$^2$, R$^3$)

—COO$^-$.N$^+$(R$^1$ R$^2$, R$^3$, R$^4$)

—SO3H.H$_2$NR$^1$

—SO$_3$H.HN(R$^1$, R$^2$)

—SO$_3$H.N(R$^1$, R$^2$, R$^3$)

—SO$_3$H$^-$.N$^+$(R$^1$, R$^2$, R$^3$, R$^4$)

In the formulae, R$^1$, R$^2$, R$^3$ and R$^4$ each independently represents a hydrogen atom, an alkyl group having 1 to 4 carbon atoms, an alkanol group having 1 to 3 carbon atoms, or an alkylalkanol group substituted by an alkyl group having 1 to 4 carbon atoms and an alkanol group having 1 to 3 carbon atoms.

As the amine, each of a primary amine, secondary amine, tertiary amine and quaternary amine can be used. In an inkjet recording liquid, water-soluble amine compounds are preferable as well as ammonia, and specific examples thereof include dimethylamine, trimethylamine, monoethylamine, diethylamine, triethylamine, propylamine, isopropylamine, dipropylamine, butylamine, isobutylamine, sec-butylamine, monoethanolamine, diethanolamine, triethanolamine, triisopropanolamine, isopropanolamine, dimethylethanolamine, diethylethanolamine and N-butyldiethanolamine. As other water-soluble amine compounds, N,N-dimethyl-1,3-diaminopropane, N,N-diethyl-1,3-diaminopropane and the like may be listed.

In the present invention, adsorption treatment of a water-soluble pigment derivative onto the surface of pigment particles can be conducted by using a dispersing machine generally used in pigment dispersion. In the adsorption treatment, a water-soluble pigment derivative is dissolved in given water in basic range, and a pigment is added to and dispersed in this solution, causing progress of the adsorption treatment. In this case, as the water used, purified water containing no metal salt of di- or more-valent, purified water, or water having corresponding purity is preferably used. The reason for this is that tap water or water containing mineral components may include a divalent metal salt, and this metal salt is insolubilized by bonding with an acidic group of the water-soluble pigment derivative, preventing dispersion in an aqueous system.

As the dispersing machines used in the adsorption treatment, there can be listed paint conditioner (manufactured by RED DEVIL), ball mill, sand mill ("DYNO-MILL" manufactured by SHINMARU ENTERPRISES COOPERATION, or the like), attritor, pearl mill ("DCP MILL" manufactured by EIRICH, or the like), CoBall-Mill, homomixer, homogenizer ("CLEARMIX" manufactured by M TECHNIQUE, or the like), wet jet mill ("GENUS PY" manufactured by GENUS Cooperation, "Nanomizer" manufactured by namomizer INC.), and the like. As the media in the dispersing machine, there can be used a glass bead, zirconia bead, alumina bead, magnetic bead, styrene bead and the like.

An aqueous pigment dispersion after the adsorption treatment may be in the condition liable to cause flocculation due to chemical structure in a water-soluble pigment derivative and the presence of an acidic functional group, and tends to cause increase in viscosity, aggregation and the like. Further, because of an excess water-soluble pigment derivative, bleeding and color mixing in printing, deterioration in water-resistance of a print, and the like may occur, limiting the use as an ink. In the present invention, dispersing property and stability over time and properties as a print are simultaneously satisfied by removing a water-soluble pigment derivative not adsorbed on a pigment to an extent wherein the above-mentioned reverse influences dot not occur. As the method for removing a non-adsorbed water-soluble pigment derivative, centrifugal separation, ultrafiltration can be used.

A pigment dispersion having excellent dispersion stability can be obtained by separating a non-adsorbed pigment derivative using ultrafiltration or centrifugal separation method. For example, an aqueous solution of a water-soluble quinacridone pigment derivative may become pudding form having extremely high viscosity by solvation of the basic aqueous solution with the pigment derivative due to chemical structures thereof. When a water-soluble pigment derivative is dispersed and adsorbed on the pigment, pH is typically controlled around 11 to 8. Only highly thixotropic dispersion may be obtained because of its flocculation-prone condition even if the amount of the water-soluble derivative added for dispersing the pigment is decreased to the lower limit of contribution to dispersion, irrespective of the pH value. It is understood that the aqueous solution of the water-soluble pigment derivative itself is a pudding-like liquid with high viscosity, and flocculation of pigment particles may be initiated because of such a dissolved pigment derivative free in the solution, which may account for nearly half of the added amount for the dispersing, having not been adsorbed on the surface of pigment particles. According to the present invention, such a thixotropic property disappears and a pigment dispersion having extremely low viscosity can be obtained, by removing a non-adsorbed water-soluble pigment derivative from the dispersion once obtained.

FIG. 1 plots a critical concentration curve on which flocculation initiates, and a critical concentration curve on which bleeding does not occur, respectively, the ordinate indicating the concentration of a non-adsorbed pigment derivative in a dispersion and the abscissa indicating the concentration of a pigment in a dispersion. It is presumed that flocculation occurs depending on both of the concentration of a pigment derivative and the distance between pigment particles. When the pigment concentration is higher, flocculation tends to initiate, and the critical concentration of a non-adsorbed pigment derivative decreases. Further, the gradient of this critical concentration curve varies depending on the type of a pigment, the particle size of pigment particles, specific surface area of pigment particles, the derivative adsorption amount, the amount of functional groups in the derivative, and the like, and by controlling these factors, a stable dispersion region can be secured.

When the pigment dispersion of the present invention is used as an inkjet recording liquid, the pigment concentration is generally in a range from 2 to 5 wt. %. In this case, the upper limit of the water-soluble pigment derivative concentration allowable not to be adsorbed and free in the solution is defined by the critical concentration curb for bleeding. This is because when the pigment concentration in a dispersion is as low as 2 to 5 wt. %, relatively higher water-soluble pigment derivative concentration is allowed from the standpoint of the generation of flocculation.

In an aqueous pigment dispersion having a pigment concentration of 15 to 20 wt. %, the viscosity can be as low as 3 to 20 cps, and the number of functional groups on a water-soluble pigment derivative is preferably 2 or less. In this case, the critical flocculation concentration is about 10 mmol/kg, preferably 1 mmol/kg (based on the amount of a pigment) in terms of the concentration of a non-adsorbed water-soluble pigment derivative at a pigment concentration of 15 wt. %, in the case of a quinacridone pigment. The amount of a water-soluble pigment derivative adsorbed on a pigment can be 0.01 to 1.5 mmol/g, preferably from 0.05 to 0.5 mmol/g, based on the amount of pigment.

When the pigment is a phthalocyanine type, the critical flocculation concentration is $1 \times 10^{-1}$ mmol/g, and preferably $1 \times 10^{-2}$ mmol/g in terms of the concentration of a non-adsorbed water-soluble pigment derivative based on the amount of pigment dispersed, at a pigment concentration of 15 wt. %. The total amount of functional groups (acidic group or salt thereof) on the surface of the pigment, which are introduced through a water-soluble pigment derivative adsorbed on the pigment, may be from 0.01 to 0.5 mmol/g, based on the amount of pigment dispersed.

Regarding the method for measuring the amount of a non-adsorbed water-soluble pigment derivative and the amount of a water-soluble pigment derivative adsorbed on a pigment, the quantification method differs depending on the kind of the intended functional group. As the method for quantifying the amount of an acidic functional group, Bohm method may be used, and it can be measured by reverse titration with an acid of the amount of an alkali which neutralizes the acidic group by titration. As a method for quantifying sulfur elements not present on the phthalocyanine skeleton such as those in a sulfonate group or sulfonate base, quantification can be conducted using emission spectroscopic analysis or ion chromatography.

Regarding the dispersed particle size of a surface treated pigment dispersion when used as an inkjet recording liquid, it is preferable that the average particle size measured by a laser light scattering particle size distribution meter is from 10 to 300 nm and the amount of coarse particles of 500 nm or more is 3 wt. % or less based on the total amount of particles. When the average dispersed particle size is too large, there are demerits that discharge stability as an inkjet recording liquid deteriorates, a precipitation is formed, and the like, consequently, it is advantageous that the amount of coarse particles is as low as possible. It is preferable that the pigment dispersion of the present invention is contained in an amount of 0.5 to 10 parts by weight, further of 2 to 5 parts by weight based on 100 parts by weight of an inkjet recording liquid. When the amount of a pigment is too small, sufficient concentration as a recording liquid is not obtained, and when too large, discharge stability and anti-nozzle clogging required for a recording liquid deteriorate.

In the inkjet recording liquid, an aqueous resin can be used for improving fixing property on paper and water-resistance of an ink coated film. The aqueous resins which can be used are largely classified into water-soluble resins and water-dispersible resins. Examples of the resins include acrylic resins, styrene-acrylic resins, vinyl acetate resins, polyester resins, polyamide resins, polyurethane resins, epoxy resins, butadiene resins, petroleum resins, fluorine resins and the like.

The dispersed particle size of a water-dispersible resin can be changed variously by controlling the polymerization operation, surfactant and the like, and usually, a resin having a particle size of dozens of nm to several thousands of nm is obtained. For avoiding clogging at nozzles, it is preferable that the average particle size of a water-dispersible resin measured by a laser light scattering particle size distribution meter is 20 to 300 nm and the amount of coarse particles of 500 nm or more is 3 wt. % or less based on the total amount of resin particles. It is more preferable that the average particle size is 50 to 200 nm and the amount of coarse particles of 500 nm or more is 2 wt. % or less based on the total amount of resin particles.

It is preferable that a water-soluble resin or water-dispersible resin is contained in an amount of 0.05 to 5 parts by weight, further preferably, 0.1 to 3 parts by weight in 100 parts by weight of an inkjet recording liquid. When the amount of a resin is too small, satisfactory water-resistance is not obtained easily, while when too large, discharge stability necessary as an inkjet recording liquid deteriorates, and disturbances such as clogging of nozzles, and the like are caused.

In the inkjet recording liquid of the present invention, there can be used anionic, cationic, nonionic and ampholytic surfactants and a polymer surfactant, for controlling surface tension and for controlling permeability into paper. A surfactant has effects on stability of a recording liquid and permeability into paper in the case of an inkjet recording liquid in which a pigment is dispersed using a surfactant, while, in the case of a pigment in which a pigment derivative is allowed to be adsorbed on the surface of a pigment, if the addition amount of a surfactant is large, the dispersion stability of the pigment may deteriorate.

Examples of the anionic surfactant include fatty acid salts, alkylsulfate ester salts, alkylarylsulfonate salts, alkyl-naphtharenesulfonate salts, dialkylsulfonate salts, dialkyl-sulfosuccinate salts, alkyl diaryl ether disulfonate salts, alkylphosphate salts, polyoxyethylene alkyl ether sulfate salts, polyoxyethylene alkylaryl ether sulfate salts, naphthalenesulfonic acid-formalin condensate, polyoxyethylene-alkylphosphate ester salts, glycerol borate fatty esters, polyoxyethylene glycerol fatty esters and the like.

Examples of the nonionic surfactant include polyoxyethylene alkyl ethers, polyoxyethylene alkylaryl ethers, polyoxyethylene oxypropylene block copolymer, sorbitan fatty esters, polyoxyethylene sorbitan fatty esters, polyoxyethylene sorbitol fatty esters, glycerine fatty esters, polyoxyethylene fatty esters, polyoxyethylenealkylamines; nonionic surfactants such as fluorine-based and silicon-based surfactants, and the like.

Examples of the cationic surfactant include alkylamine salts, quaternary ammonium salts, alkylpyridinium salts, alkylimidazolinium salts and the like.

Examples of the ampholytic surfactant include alkylbetaines, alkylamine oxides, phosphatidylcholine and the like.

Examples of the polymer surfactant include acrylic water-soluble resins, styrene/acrylic water-soluble resins, water-soluble polyester resins, water-soluble polyamide resins and the like.

The anionic surfactant, cationic surfactant, nonionic surfactant and polymer surfactant can also be used in combination of two or more.

The aqueous pigment dispersion and inkjet recording liquid of the present invention may be constituted of a surface treated pigment, aqueous resin and if necessary, other additives, dissolved in an aqueous medium.

The aqueous medium means water, an organic solvent miscible with water, and mixtures thereof, and as the water, ion exchanged water from which metal ions and the like have been removed or distilled water is used in an amount of 49 to 95 wt. % based on the amount of the aqueous pigment dispersion or inkjet recording liquid.

The aqueous solvent represents an organic solvent miscible with water in the present specification, and prevents drying and solidification of a recording liquid at nozzle portions as an inkjet recording liquid, and provides stable spray of a recording liquid and prevent drying over time, and is used alone or in admixture in an amount of 1 to 50 wt. %, preferably 2 to 25 wt. % based on the recording liquid.

Examples of the aqueous solvent include ethylene glycol, diethylene glycol, propylene glycol, 1,3-propanediol, triethylene glycol, polyethylene glycol, glycerin, tetraethylene glycol, dipropylene glycol, ketone alcohol, diethylene glycol monobutyl ether, ethylene glycol monobutyl ether, triethylene glycol monobutyl ether, ethylene glycol monoethyl ether, 1,2-hexanediol, N-methyl-2-pyrrolidone, pyrrolidone, 2,4,6-hexanetriol, tetrafrufuryl alcohol, 4-methoxy-4-methylpentanone and the like.

For accelerating drying of a recording liquid, there can also be used alcohols such as methanol, ethanol, isopropyl alcohol and the like.

In the inkjet recording liquid of the present invention, various additives as described below can be used if necessary.

When a printing body for a recording liquid is a material having permeability like paper, a permeation agent can be added to accelerate permeation of a recording liquid into paper and to promote apparent drying ability.

As the permeation agent, there can be used glycol ethers such as diethylene glycol monobutyl ether as exemplified for the aqueous solvent, or alkylene glycol, polyethylene glycol monolauryl ether, sodium laurylsulfate, sodium dodecylbenzenesulfonate, sodium oleate, sodium dioctylsulfosuccinate, and the like. These are used in an amount of 0 to 5 wt. %, preferably 0.1 to 5 wt. % based on the amount of the recording liquid. The permeation agent manifests sufficient effects at the above-described use amount, and when over the use amount, exudation of prints, and print through are caused, meaning undesirable phenomena.

A preservative is added for the purpose of preventing generation of mold and bacteria in a recording liquid, and as the preservative, there can be used sodium dehydroacetate, sodium benzoate, sodium pyridinethione-1-oxide, zinc pyridinethione-1-oxide, 1,2-benzisothiazoline-3-one, amine salts of 1-benzisothiazoline-3-one, and the like. These are preferably used in an amount of 0.05 to 1.0 wt. % in a recording liquid.

A chelating agent blocks a metal ion in a recording liquid, and prevents deposition of a metal at nozzle portions and deposition of an insoluble substance in a recording liquid, and there are used ethylenediaminetetraaetic acid, sodium salt of ethylenediaminetetraaetic acid, diammonium salt of ethylenediaminetetraaetic acid, tetraammonium salt of ethylenediaminetetraaetic acid and the like. These are used in an amount of 0.005 to 0.5 wt. % in a recording liquid.

Further, pH controlling agents such as amines, inorganic salts, ammonia and the like and buffer solutions such as phosphoric acid and the like can be used for controlling pH of a recording liquid, and for obtaining stability of a recording liquid and stability with piping for a recording liquid in a recording apparatus.

Moreover, a de-foaming agent can also be added to prevent generation of foam in discharge of a recording liquid, or in circulation and movement in piping, or in production of a recording liquid.

The inkjet recording liquid of the present invention can be produced by dispersing the pigment dispersion and aqueous resin in an aqueous medium, and appropriately diluting the dispersion and adding other additives to the dispersion.

Dispersing can be conducted using a disper, sand mill, homogenizer, ball mill, paint shaker, ultrasonic dispersing machine, and the like. Mixing and stirring can be conducted by a high speed dispersing machine, emulsifier and the like, in addition to stirring by a stirring machine using a conventional blade.

It is preferable that the mixed recording liquid is sufficiently filtrated through a filter having a pore diameter of 0.65 μm or less, further preferably, a filter having a pore diameter of 0.45 μm or less, before or after dilution. Filtration by centrifugal separation can also be conducted prior to filtration through a filter, and by this, clogging in the filter filtration can be reduced and frequency of filter exchange can be reduced.

A recording liquid is preferably controlled as a solution having a viscosity of 0.8 to 15 cps (25° C.), depending on the mode of a recording apparatus. The surface tension is preferably controlled to 25 to 73 dyn/cm. pH is not particularly restricted, and weak alkaline property of 7 to 10 is preferable.

The aqueous pigment dispersion of the present invention can be utilized in wide rage fields such as printing ink, paints, cosmetics, writing ink, toners, liquid developer, electrophotography materials, and the like, in addition to an inkjet recording liquid.

EXAMPLES

The present invention will be illustrated further in detail based on examples, however, the examples do not limit the scope of the present invention. In examples, part and % represent part by weight and wt. %, respectively.

The particle size and viscosity of aqueous pigment dispersions obtained in examples and comparative examples, storage stability thereof, re-dissolving property of dried powder, the particle size, viscosity, storage stability, discharge stability, water-resistance, clogging-resistance, print quality on normal paper, the amount of introduced functional groups, the amount of a non-adsorbed pigment derivative, zeta potential and the like were measured according to the following methods.

(1) Particle Size

Particle sizes were measured by using a particle size distribution meter of laser diffraction mode ("MICROTRAC PARTICLE SIZE ANALIZER UPA" manufactured by NIKISO CO., LTD.), and the average particle size (value of d99) and the content of coarse particles of 500 nm or more was calculated.

(2) Viscosity

The viscosity at 25° C. was measured by a vibration type viscometer ("VM-1A" manufactured by Yamaichi Electronic Co., Ltd.) at lower viscosity range, and the viscosity at 25° C. was measured by a type B viscometer at middle or higher viscosity range.

(3) Storage Stability

In the case of an aqueous pigment dispersion, the number of days in the storage period in which particle size change at 50° C. was less than 15 nm and viscosity change was less than 0.5 cps is shown. When the storage stability was one day or less, the result is represented by X.

In the case of an inkjet recording liquid, the storage stability thereof was evaluated based on changes in the viscosity and particle size after storage for 3 months at 50° C. (○: particle size change is less than 15 nm and viscosity change is less than 0.2 cps, X: particle size change is not less than 15 nm or viscosity change is not less than 0.2 cps).

(4) Foaming Property 30 ml of an aqueous pigment dispersion was added to a 50 ml screw tube equipped with a cap, shaken up and down vigorously 20 times, and the foaming property was evaluated by the foaming condition after 3 minutes (◎: foam disappears, ○: a little foam on the inner surface of screw tube, Δ: foam are foamed on the whole surface and the foamed height is less than 3 mm, X: foam are foamed on the whole surface and the foamed height is not less than 3 mm). 3

(5) Surface Tension

The surface tension at 25° C. was measured by a surface tension meter ("CBVP-Z" manufactured by KYOWA INTERFACE SCIENCE CO., LTD).

(6) Discharge Stability

An inkjet recording liquid was filled in a cartridge of an inkjet printer ("HG-5130" manufactured by Epson), printing was conducted using this on normal paper ("K" manufactured by Xerox), and the discharge stability was evaluated (○: continuous discharge from nozzles stably for 120 minutes or more, Δ: impacts points of drops are disturbed in continuous discharge for 120 minutes, X: no stable discharge from nozzles).

(7) Water-Resistance

The print obtained in the above (4) was rubbed with a finger after wetting with water, and the change of the print was evaluated visually (○: exudation of ink and peeling are not recognized, X : exudation of ink and peeling are recognized).

(8) Clogging-Resistance

A cap of a printer was removed after printing in the same manner as in (6), and one hour later, printing was conducted again, and presence or absence of clogging was evaluated (○: no clogging of nozzles. X: clogging of nozzles is found).

(9) Printing Quality

An inkjet recording liquid was filled in a cartridge of an inkjet printer ("PM-750C" manufactured by Epson), printing was conducted using this on normal paper ("4024" manufactured by Xerox), and the feathering property of the ink was evaluated (○: scarce feathering, and the Chinese character "龍" (pronounced "ryu") can be judged without exudation, X: feathering is recognized and the Chinese character "龍" can not be judged due to exudation).

(10) Amount of Functional Groups (Sulfonate Group) Introduced by an Adsorption of Pigment Derivative The treated pigment dispersion was dried, the dried pigment was acidolyzed with nitric acid and an aqueous perchloric acid solution to obtain an aqueous solution, and the amount of sulfur was measured by emission spectroscopic analysis, and the amount of sulfur was converted in terms of a sulfonate group or sulfonate salt.

(11) Measurement of the Amount of Non-adsorbed Pigment Derivative (Sulfonate Group)

The amount of a sulfonate group in a pigment derivative was measured by emission spectroscopic analysis, and the amount of sulfur was converted in terms of a sulfonate group or sulfonate salt, to know the number of functional groups. The amount of sulfur in a permeation solution in ultrafiltration was measured by emission spectroscopic analysis, and the amount of sulfur was converted in terms of a sulfonate group or sulfonate salt, and the existing amount of pigment derivative in a permeation solution was calculated based on the number of functional groups of the derivative.

(12) Zeta Potential Measurement

A pigment dispersion was diluted with purified water to a range wherein measurement is possible, and the zeta potential of the pigment dispersion was measured by a zeta potential measuring apparatus (Zeta PALS, manufactured by NIKISO CO., LTD.).

Example 1

20 g of a micronized pigment having an average primary particle size of 30 nm or less prepared by salt milling C.I. Pigment Red 122, 2 g of a sulfonated quinacridone derivative (the average number of sulfonate group introduced was 1), and 110 g of ion exchange water were mixed, and sodium hydroxide was added so that pH of the mixture reached 9 or more, and the mixtures were dispersed for about 5 hours by a paint shaker using zirconia beads as media. The pigment dispersion was washed by ultrafiltration until the derivative concentration in the permeated water reached 0.9 mmol/kg or less while adding ion exchange water, and concentrated so that the solid content of the pigment dispersion was 15 wt. % around a pH of the circulated water of 8.5.

Example 2

20 g of a micronized pigment having an average primary particle size of 30 nm or less prepared by salt milling C. I. Pigment Violet 19, 1.6 g of a sulfonated quinacridone derivative (the average number of sulfonate group introduced was 1.2), and 110 g of ion exchange water were mixed, and sodium hydroxide was added so that pH of the mixture reached 9 or more, and the mixtures were dispersed for about 5 hours by a paint shaker using zirconia beads as media. The pigment dispersion was washed by ultrafiltration until the derivative concentration in the permeated water reached 1.4 mmol/kg or less while adding ion exchange water, and concentrated so that the solid content of the pigment dispersion was 15 wt. % around a pH of the circulated water of 9.0.

Example 3

20 g of a micronized pigment having an average primary particle size of 30 nm or less prepared by salt milling C. I. Pigment Red 202, 2.4 g of a sulfonated dichloroquinacridone derivative (the average number of sulfonate group introduced was 0.9), and 110 g of ion exchange water were mixed, and sodium hydroxide was added so that pH of the mixture reached 9 or more, and the mixtures were dispersed for about 5 hours by a paint shaker using zirconia beads as media. The pigment dispersion was washed by ultrafiltration until the derivative concentration in the permeated water reached 0.4 mmol/kg or less while adding ion exchange water, and concentrated so that the solid content of the pigment dispersion was 15 wt. % around a pH of the circulated water of 9.0.

Comparative Example 1

20 g of a micronized pigment having an average primary particle size of 30 nm or less prepared by salt milling C. I. Pigment Red 122, 4 g of C. I. Acid Red 259 and 110 g of ion exchange water were mixed, and sodium hydroxide was Aadded so that pH of the mixture reached 9 or more, and the mixtures were dispersed for about 5 hours by a paint shaker using zirconia beads as media, to give a pigment dispersion.

Comparative Example 2

20 g of a micronized pigment having an average primary particle size of 30 nm or less prepared by salt milling C. I. Pigment Red 122, 6 g of C. I. Acid Red 154 and 110 g of ion exchange water were mixed, and sodium hydroxide was added so that pH of the mixture reached 9 or more, and the mixtures were dispersed for about 5 hours by a paint shaker using zirconia beads as media, to give a pigment dispersion.

Comparative Example 3

20 g of a micronized pigment having an average primary particle size of 30 nm or less prepared by salt milling C. I. Pigment Red 122, 2 g of a sulfonated quinacridone derivative (the average number of sulfonate group introduced was 1), and 110 g of ion exchange water were mixed, and sodium hydroxide was added so that pH of the mixture reached 9 or more, and the mixtures were dispersed for about 5 hours by a paint shaker using zirconia beads as media.

TABLE 1

|  | Average particle size (nm) | 500 nm or more (%) | Storage stability | Foaming property | Viscosity (cps) | Surface tension (mN/m) |
|---|---|---|---|---|---|---|
| Example 1 | 100 | <1 | 30 days or more | ⊚ | 3.8 | 72.1 |
| Example 2 | 110 | <1 | 30 days or more | ⊚ | 4.5 | 71.6 |
| Example 3 | 105 | <1 | 30 days or more | ⊚ | 5.0 | 70.7 |
| Comparative Example 1 | 250 | >3 | x | Δ | 150 | 60.5 |
| Comparative Example 2 | 260 | >3 | x | Δ | 200 | 48.4 |
| Comparative Example 3 | 250 | >3 | x | Δ | 300 | 68.0 |

Examples 4–6 and Comparative Examples 4–6

Raw materials having formulations shown in Table 2 were charged into a stirring vessel, stirred and mixed with a disper, then, filtrated through a membrane filter of 0.45 μm, to obtain an inkjet recording liquid. Regarding the resulted inkjet recording liquid, the particle size and viscosity were measured, and the storage stability, discharge stability, water-resistance and clogging-resistance were evaluated. The results are shown in Table 2.

(a) Water-soluble Resin Solution: Styrene/acrylic water-soluble resin aqueous solution manufactured by Johnson Polymer Co., Ltd., "Johncryl J-62", its solid content is about 34%.

(b) Activating Agent: Anionic surfactant "PELEX 0T-P" manufactured by Kao Corp., its solid content is about 70%.

(c) Fungicide: "PROXEL GXL" manufactured by Zeneca K. K.

TABLE 2

|  |  | Example | | | Comparative Example | | |
|---|---|---|---|---|---|---|---|
| Recording liquid | | 4 | 5 | 6 | 4 | 5 | 6 |
| Pigment dispersion | Kind | Example 1 | Example 2 | Example 3 | Comparative Example 1 | Comparative Example 2 | Comparative Example 3 |
|  | Amount (part) | 20 | 20 | 20 | 20 | 20 | 20 |
|  | Average particle size (nm) | 100 | 110 | 105 | 250 | 260 | 250 |
|  | 500 nm or more (%) | <1 | <1 | <1 | >3 | >3 | >3 |

TABLE 2-continued

|  |  | Example | | | Comparative Example | | |
|---|---|---|---|---|---|---|---|
| Recording liquid | | 4 | 5 | 6 | 4 | 5 | 6 |
| Resin aqueous solution (part) | | 1 | 1 | 1 | 3 | 3 | 3 |
| Glycerin (part) | | 10 | 15 | 20 | 15 | 15 | 15 |
| Ethylene glycol (part) | | 5 | 0 | 0 | 5 | 0 | 0 |
| Diethylene glycol monobutyl ether (part) | | 5 | 5 | 0 | 0 | 5 | 0 |
| Activating agent (part) | | 0 | 0 | 0.1 | 0.1 | 0 | 0.2 |
| Fungicide (part) | | 0.1 | 0.1 | 0.1 | 0.1 | 0.1 | 0.1 |
| Ion exchanged water (part) | | 58.9 | 68.9 | 58.4 | 56.4 | 56.8 | 61.4 |
| Properties of recording liquid | Average particle size (nm) | 100 | 115 | 110 | 280 | 320 | 270 |
| | Viscosity (cps) | 1.5 | 1.7 | 1.9 | 23.5 | 15.0 | 4.8 |
| | Storage stability | ○ | ○ | ○ | Δ | x | ○ |
| | Discharge stability | ○ | ○ | ○ | x | x | Δ |
| | Water-resistance | ○ | ○ | ○ | ○ | x | ○ |
| | Clogging-resistance | ○ | ○ | ○ | x | x | x |
| Printing quality | | ○ | ○ | ○ | x | x | x |

Example 7

20 g of a micronized pigment having an average primary particle size of 50 nm or less prepared by salt milling C. I. Pigment Blue 15:3, 2 g of a sulfonated copper phthalocyanine derivative (the average number of sulfonate group introduced was 1.3), and 110 g of ion exchange water were mixed, and sodium hydroxide was added so that pH of the mixture reached 9 or more, and the mixture were dispersed for about 5 hours by a paint shaker using zirconia beads as media. A non-adsorbed pigment derivative was separated by ultrafiltration from the pigment dispersion diluted with ion exchange water to a pigment concentration of 3 wt. %, washed until the derivative concentration in the permeated water reached 0.005 mmol/g or less based on the pigment amount while adding ion exchange water, and concentrated so that the solid content of the pigment dispersion was 15 wt. % around a pH of the circulated water of 8.5. The amount of a sulfonate group in the treated pigment at this point was 0.2 mmol/g based on the amount of pigment, showing approximately the same value as the amount of surface acidic group determined by titration. The zeta potential measured was −55.

Example 8

20 g of a micronized pigment having an average primary particle size of 30 nm or less prepared by salt milling C. I. Pigment Blue 16, 1.6 g of a sulfonated non-metal phthalocyanine derivative (the average number of sulfonate group introduced was 1.2), and 110 g of ion exchange water were mixed, and sodium hydroxide was added so that pH of the mixture reached 9 or more, and the mixtures were dispersed for about 5 hours by a paint shaker using zirconia beads as media. A non-adsorbed pigment derivative was separated by ultrafiltration from the pigment dispersion diluted with ion exchange water to a pigment concentration of 3 wt. %, washed until the derivative concentration in the permeated water reached 0.002 mmol/g or less based on the amount of pigment while adding ion exchange water, and concentrated so that the solid content of the pigment dispersion was 15 wt. % around a pH of the circulated water of 9.0. The amount of a sulfonate group in the treated pigment at this point was 0.18 mmol/g based on the amount of pigment, showing approximately the same value as the amount of surface acidic group determined by titration. The zeta potential measured was −50.

Example 9

20 g of a micronized pigment having an average primary particle size of 30 nm or less prepared by salt milling C. I. Pigment Green 36, 2.4 g of a sulfonated copper phthalocyanine derivative (the average number of sulfonate group introduced was 1.6), and 110 g of ion exchange water were mixed, and sodium hydroxide was added so that pH of the mixture reached 9 or more, and the mixtures were dispersed for about 5 hours by a paint shaker using zirconia beads as media. A non-adsorbed pigment derivative was separated by ultrafiltration from the pigment dispersion diluted with ion exchange water to a pigment concentration of 3 wt. %, washed until the derivative concentration in the permeated water reached 0.003 mmol/g or less based on the amount of pigment while adding ion exchange water, and concentrated so that the solid content of the pigment dispersion was 15 wt. % around a pH of the circulated water of 9.0. The amount of a sulfonate group in the treated pigment at this point was 0.12 mmol/g based on the amount of pigment, showing approximately the same value as the amount of surface acidic group determined by titration. The zeta potential measured was −40.

Comparative Example 7

20 g of a micronized pigment having an average primary particle size of 50 nm or less prepared by salt milling C. I. Pigment Blue 15:3, 2 g of a sulfonated copper phthalocyanine derivative (the average number of sulfonate group introduced was 1.3), and 110 g of ion exchange water were mixed, and sodium hydroxide was added so that pH of the mixture reached 9 or more, and the mixtures were dispersed for about 5 hours by a paint shaker using zirconia beads as media.

The resulted pigment dispersion had high viscosity and caused flocculation, and the concentration of the non-adsorbed pigment derivative was 1.4 mmol/g based on the amount of pigment. The pigment dispersion was further diluted to a concentration of 3 wt. % and dropped on No. 2 filter paper to recognize green bleeding of the pigment derivative.

Comparative Example 8

20 g of a micronized pigment having an average primary particle size of 30 nm or less prepared by salt milling C. I. Pigment Blue 16, 8 g of Reactive Blue 2, and 110 g of ion exchange water were mixed, and sodium hydroxide was added so that pH of the mixture reached 9 or more, and the mixtures were dispersed for about 5 hours by a paint shaker using zirconia beads as media, to give a pigment dispersion.

Comparative Example 9

20 g of a micronized pigment having an average primary particle size of 30 nm or less prepared by salt milling C. I.

Pigment Blue 15:4, 2 g of C. I. Direct Blue 86, and 110 g of ion exchange water were mixed, and sodium hydroxide was added so that pH of the mixture reached 9 or more, and the mixtures were dispersed for about 5 hours by a paint shaker using zirconia beads as media.

TABLE 3

|  | Average particle size (nm) | 500 nm or more (%) | Storage stability | Foaming property | Viscosity (cps) | Surface tension (mN/m) |
|---|---|---|---|---|---|---|
| Example 7 | 150 | <1 | 30 days or more | ⊚ | 4.8 | 72.1 |
| Example 8 | 130 | <1 | 30 days or more | ⊚ | 5.5 | 70.6 |
| Example 9 | 125 | <1 | 30 days or more | ⊚ | 7.0 | 71.7 |
| Comparative Example 7 | 500 | >3 | x | Δ | 10.0 | 60.0 |
| Comparative Example 8 | 1650 | >3 | x | Δ | 280 | 58.4 |
| Comparative Example 9 | 780 | >3 | x | Δ | 550 | 67.0 |

Examples 10–12 and Comparative Examples 10–12

Raw materials having formulations shown in Table 4 were charged into a stirring vessel, stirred and mixed with a disper, then, filtrated through a membrane filter of 0.8 μm, to obtain an inkjet recording liquid. Regarding the resulted inkjet recording liquid, the particle size and viscosity were measured, and the storage stability, discharge stability, water-resistance and clogging-resistance were evaluated. The results are shown in Table 4.
(a) Water-soluble Resin Solution: Styrene/acrylic water-soluble resin aqueous solution manufactured by Johnson Polymer Co., Ltd., "Johncryl J-62", its solid content is about 34%.
(b) Activating Agent: Anionic surfactant "PELEX OT-P" manufactured by Kao Corp., its solid content is about 70%.
(c) Fungicide: "PROXEL GXL" manufactured by Zeneca K. K.

What is claimed is:
1. A self-dispersible aqueous pigment dispersion comprising an aqueous solution, particles of a pigment and a water-soluble pigment derivative, said particles being dispersed in the aqueous pigment dispersion in a concentration within the range from 2 to 25 wt. % based on the amount of the aqueous pigment dispersion,
    wherein a part of the water-soluble pigment derivative is adsorbed on the surface of the particles of the pigment to form dispersed particles comprising the particles of the pigment adsorbed by said part of the pigment derivative, and,
    the remaining parts of the water-soluble pigment derivative are free in the dispersion without being adsorbed on the surface of the pigment in a concentration less than the critical flocculation concentration on which flocculation is initiated on said particles of the pigment dispersed under said concentration,
    wherein said pigment is selected from the group (1) consisting of quinacridone pigments, phthalocyanine pigments, azo pigments, diketopyrrolopyrrole pigments, threne pigments, perynone pigments, perylene pigments, dioxazine pigments, isoindolinone pigments, benzimidazolone pigments, anthraquinone pigments, and mixtures thereof, and the water-soluble pigment derivative is a pigment selected from said group (1), further substituted by an acidic functional group or salt thereof.
2. The aqueous pigment dispersion according to claim 1, wherein said acidic functional group is a carboxylate group or sulfonate group.
3. The aqueous pigment dispersion according to claim 1, wherein said dispersed particles have an average particle diameter of 10 to 300 nm.
4. The aqueous pigment dispersion according to claim 1, wherein said particles of the pigment are dispersed in the aqueous pigment dispersion in a concentration within the range from 15 to 20 wt. % based on the amount of the aqueous pigment dispersion, and the viscosity of the aqueous pigment dispersion is 3 to 20 cps.

TABLE 4

|  |  | Example | | | Comparative Example | | |
|---|---|---|---|---|---|---|---|
| Recording liquid |  | 10 | 11 | 12 | 10 | 11 | 12 |
| Pigment dispersion | Kind | Example 7 | Example 8 | Example 9 | Comparative Example 7 | Comparative Example 8 | Comparative Example 9 |
|  | Amount (part) | 20 | 20 | 20 | 20 | 20 | 20 |
|  | Average particle size (nm) | 150 | 130 | 125 | 500 | 1650 | 780 |
|  | 500 nm or more (%) | <1 | <1 | <1 | >3 | >3 | >3 |
| Resin aqueous solution (part) |  | 1 | 1 | 1 | 3 | 3 | 3 |
| Glycerin (part) |  | 10 | 15 | 20 | 15 | 15 | 15 |
| Ethylene glycol (part) |  | 5 | 0 | 0 | 5 | 0 | 0 |
| Diethylene glycol monobutyl ether (part) |  | 5 | 5 | 0 | 0 | 5 | 0 |
| Activating agent (part) |  | 0 | 0 | 0.1 | 0.1 | 0 | 0.2 |
| Fungicide (part) |  | 0.1 | 0.1 | 0.1 | 0.1 | 0.1 | 0.1 |
| Ion exchanged water (part) |  | 58.9 | 68.9 | 58.8 | 56.8 | 56.9 | 61.7 |
| Properties of recording liquid | Average particle size (nm) | 160 | 150 | 140 | 500 | 480 | 570 |
|  | Viscosity (cps) | 2.0 | 2.3 | 3.2 | 5.6 | 7.3 | 8.5 |
|  | Storage stability | ○ | ○ | ○ | Δ | x | x |
|  | Discharge stability | ○ | ○ | ○ | x | x | x |
|  | Water-resistance | ○ | ○ | ○ | ○ | x | x |
|  | Clogging-resistance | ○ | ○ | ○ | x | x | x |
| Printing quality |  | ○ | ○ | ○ | x | x | x |

5. The aqueous pigment dispersion according to claim 1, wherein said part of the water-soluble pigment derivative adsorbed on the surface of the pigment is in an amount ranging from 0.01 to 1.5 mmol/g based on the amount of said particles of the pigment.

6. The aqueous pigment dispersion according to claim 1, wherein the pigment comprises a condensed polycyclic pigment.

7. The aqueous pigment dispersion according to claim 6, wherein said condensed polycyclic pigment is a quinacridone pigment or phthalocyanine pigment.

8. An inkjet recording liquid comprising the aqueous pigment dispersion according to claim 1, a surfactant and/or an aqueous resin.

9. A method for preparing a self-dispersible aqueous pigment dispersion in which particles of the pigment are dispersed in a concentration within the range from 2 to 25 wt. % based on the amount of the aqueous pigment dispersion, said method comprising the steps of:

(a) dispersing said particles of the pigment in an aqueous solution in which a water-soluble pigment derivative has been dissolved, to allow a part of the pigment derivative to be adsorbed on the surface of the particles, thereby forming dispersed particles comprising the particles of the pigment adsorbed by said part of the pigment derivative; and, (b) removing the remaining parts of the pigment derivative free in the aqueous solution without being adsorbed in the step (a) to a concentration less than the critical flocculation concentration on which flocculation is capable of being initiated on said particles of the pigment dispersed under said concentration, wherein said pigment is selected from the group (1) consisting of quinacridone pigments, phthalocyanine pigments, azo pigments, diketopyrrolopyrrole pigments, threne pigments, perynone pigments, perylene pigments, dioxazine pigments, isoindolinone pigments, benzimidazolone pigments, anthraquinone pigments, and mixtures thereof, and the water-soluble pigment derivative is a pigment selected from said group (1), further substituted by an acidic functional group or salt thereof.

10. The method according to claim 9, wherein the step (b) comprises ultrafiltration.

11. The method according to claim 9, wherein the acidic functional group is carboxylate residue.

12. The method according to claim 9, wherein the dispersed particles have an average particle diameter of 10 to 300 nm.

13. The method according to claim 9, wherein the particles of the pigment are dispersed in the aqueous pigment dispersion in a concentration within the range from 15 to 20 wt. % based on the amount of the aqueous pigment dispersion, and the viscosity of the aqueous pigment dispersion is 3 to 20 cps.

14. The method according to claim 9, wherein the step (a) is conducted until said part of the pigment derivative adsorbed on the surface reaches 0.01 to 1.5 mmol/g based on the amount of the particles of the pigment.

15. The method according to claim 9, wherein the pigment comprises a condensed polycyclic pigment.

16. The method according to claim 15, wherein the condensed polycyclic pigment is a phthalocyanine pigment or quinacridone pigment.

* * * * *